(12) United States Patent
Sartre

(10) Patent No.: US 8,261,550 B2
(45) Date of Patent: Sep. 11, 2012

(54) POWER UNIT FOR AN AUTOMOTIVE VEHICLE AND VEHICLE INCLUDING SUCH A POWER UNIT

(75) Inventor: Vincent Sartre, Bron (FR)

(73) Assignee: Renault Trucks, St. Priest (FR)

( * ) Notice: Subject to any disclaimer, the term of this patent is extended or adjusted under 35 U.S.C. 154(b) by 407 days.

(21) Appl. No.: 12/516,827

(22) PCT Filed: Dec. 19, 2006

(86) PCT No.: PCT/IB2006/004070
§ 371 (c)(1),
(2), (4) Date: May 29, 2009

(87) PCT Pub. No.: WO2008/075127
PCT Pub. Date: Jun. 26, 2008

(65) Prior Publication Data
US 2010/0044127 A1   Feb. 25, 2010

(51) Int. Cl.
*F02B 33/44* (2006.01)
*F02G 3/00* (2006.01)
(52) U.S. Cl. ............................. 60/607; 60/624
(58) Field of Classification Search .............. 60/607, 60/608, 614, 624; 123/559.3
See application file for complete search history.

(56) References Cited

U.S. PATENT DOCUMENTS

| 3,673,797 | A |   | 7/1972 | Wilkinson |       |
|-----------|---|---|--------|-----------|-------|
| 5,079,913 | A | * | 1/1992 | Kishishita | 60/624 |
| 5,138,840 | A | * | 8/1992 | Oguchi et al. | 60/624 |
| 5,890,468 | A | * | 4/1999 | Ozawa | 123/561 |
| 6,527,658 | B2 | * | 3/2003 | Holmes et al. | 475/5 |
| 7,174,714 | B2 | * | 2/2007 | Algrain | 60/608 |
| 7,490,594 | B2 | * | 2/2009 | Van Dyne et al. | 123/561 |

FOREIGN PATENT DOCUMENTS

| EP | 0178270 A | 4/1986 |
| EP | 0352064 A1 | 1/1990 |
| EP | 0420705 A1 | 4/1991 |
| EP | 0755816 A | 1/1997 |
| GB | 2390871 A | 1/2004 |
| JP | 02030924 | 2/1990 |
| JP | 03117632 | 5/1991 |
| JP | 08189370 | 7/1996 |
| WO | 9202719 A | 2/1992 |

OTHER PUBLICATIONS

Japanese Official Action from corresponding JP App. 2009-542243 (with translation), Mar. 9, 2011.
International Search Report for corresponding International Application PCT/IB2006/004070, Aug. 30, 2007.
International Preliminary Report on Patentability for corresponding International Application PCT/IB2006/004070, Mar. 17, 2009.

* cited by examiner

*Primary Examiner* — Quyen Leung
*Assistant Examiner* — Thomas Truong
(74) *Attorney, Agent, or Firm* — WRB-IP LLP

(57) ABSTRACT

A power unit for an automotive vehicle includes an internal combustion engine, an electric machine electrically connected to electrical power storage arrangement, and a turbocharger comprising a first turbine located in an exhaust line of the engine. This power unit further includes a second turbine, located in an exhaust line of the engine and drivingly connected to the electric machine, and a transmission set. A first input/output of the transmission set is connected to the second turbine and a second input/output of the transmission set is connected to a crankshaft of the internal combustion engine. The transmission set has an adjustable speed reduction ratio between its first and second inputs/outputs.

16 Claims, 7 Drawing Sheets

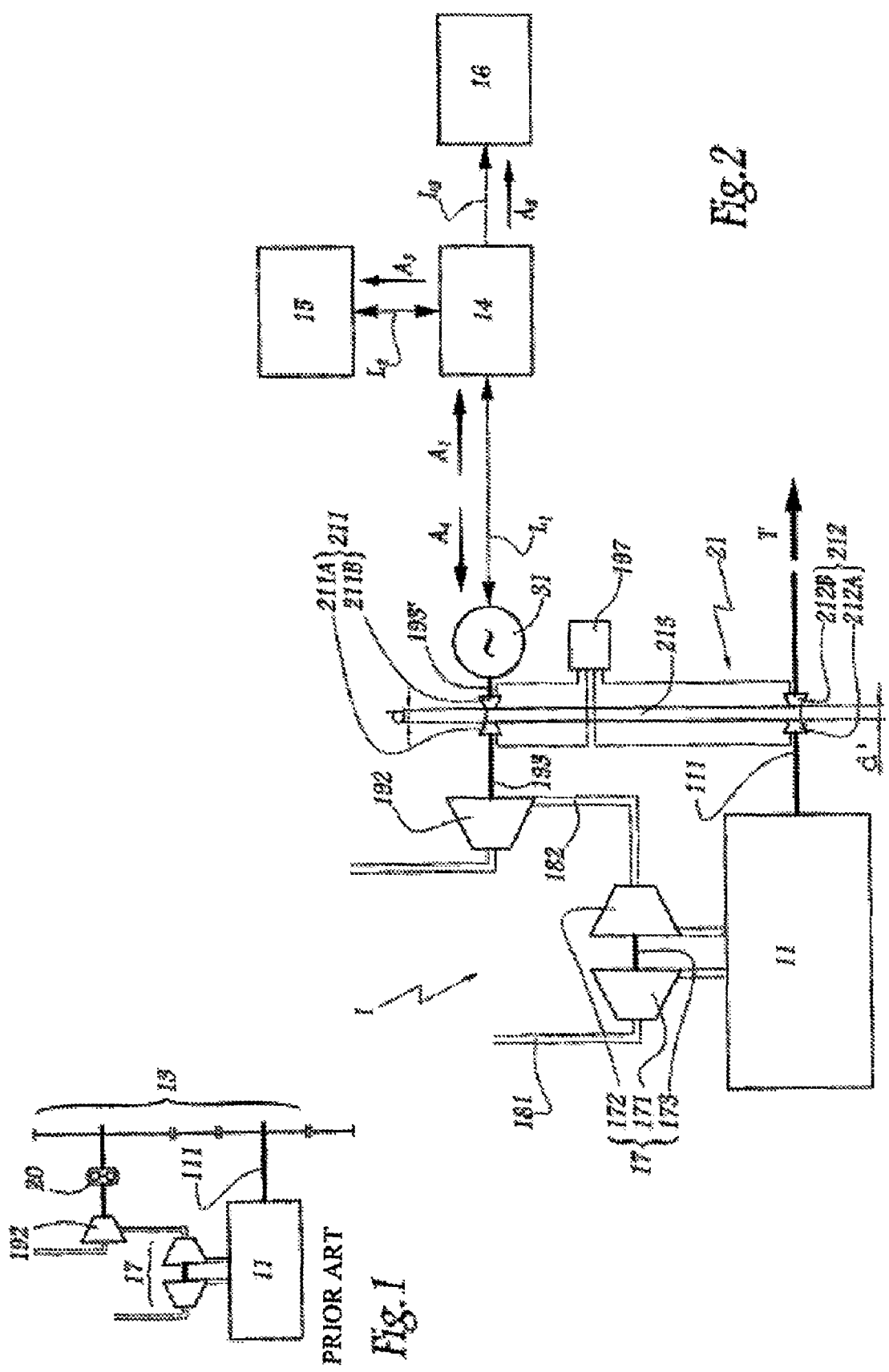

POWER UNIT FOR AN AUTOMOTIVE VEHICLE AND VEHICLE INCLUDING SUCH A POWER UNIT

BACKGROUND AND SUMMARY

This invention concerns a power unit for an automotive vehicle and an automotive vehicle including such a power unit.

The reduction of fuel consumption of automotive vehicles, in particular trucks, is a major issue for the sustainability of road transport and is a vital element for the competitiveness of trucks manufacturers. A majority of trucks is fitted with a turbocharged diesel engine that runs, on the one hand, the driving wheels through a transmission and, on the other hand, auxiliary equipments, such as a lighting system or a window actuator. Some of these auxiliary equipments are usually fed by an electrical network whose electrical power is produced by an alternator driven by the internal combustion engine of the truck. In order to obtain fuel economies when running an automotive vehicle, one can consider recovering energy which would otherwise be wasted. Known techniques can limit a fraction of the energy losses. This concerns hybrid systems where braking energy is recovered through electrical power storage. In so-called "hybrid electric vehicles" or "HEVs", one uses a combination of an internal combustion engine with one or several electrical machines and some storage means such as batteries. EP-A-O 366 536 teaches the use of a turbine located in an exhaust line of an internal combustion engine, downstream of a turbocharger, in order to drive an electrical generator which loads a battery. A mechanical pump is also driven by this turbine, in order to load a reservoir of fluid under pressure. No power can be added to the power delivered by the engine. FIG. 1 shows the general layout of a mechanical turbo compound system which comprises an internal combustion engine 11 equipped with a turbo charger 17. A turbine 192 is installed in an exhaust line of engine 11 and coupled, via a hydraulic torque converter 20 and a gear train 13, to the crankshaft 111 of engine 11. Power transmission within converter 20 takes place by friction, which induces high energy losses. Moreover, the speed ratio of the output shaft 193 of turbine 192 and crankshaft 111 is fixed, so that it is not possible to keep items 192 and 111 at rotation speeds corresponding to optimized working conditions for each of them.

According to an aspect of the present invention, a new power unit is provided for an automotive vehicle which enables an efficient energy recovery including when the automotive vehicles run with a stabilized speed, with a great versatility of the conditions of use of the power unit.

The invention concerns, according to an aspect thereof, a power unit for an automotive vehicle, this unit including an internal combustion engine, an electric machine electrically connected to electrical power storage means, a turbocharger comprising a first turbine located in an exhaust line of the engine and a second turbine located in an exhaust line of the engine and drivingly connected to the electric machine. This power unit is characterized in that it further includes a power transmission set having a first input/output connected to the second turbine and a second input/output connected to a crankshaft of the internal combustion engine, whereas the power transmission set has an adjustable speed reduction ratio between its first and second inputs/outputs.

Thanks to an aspect of the invention, energy recovery takes place via the second turbine and the associated power transmission set, whose reduction ratio can be adjusted to optimize the working conditions of both the second turbine and the crankshaft. The power transmission set does not transfer energy by friction, unlike a hydraulic torque converter, which implies that energy losses can be low. The recovered energy can be used either electrically or mechanically, depending on the actual setting of the power transmission set. In particular, the energy recovered by the second turbine can be directed towards the electric machine and/or towards the crankshaft of the internal combustion engine.

According to further aspects of the invention, such a power unit might incorporate one or several of the following features:

According to a first embodiment of the invention, the transmission set comprises a pulley and a belt type continuously variable transmission set (CVT set). The continuously variable power transmission set includes advantageously two bi-conical pulleys connected by a belt, whereas the second turbine and the electric machine are connected to two parts of the same pulley whose relative position can be modified in order to adjust the speed reduction ratio of said transmission set and whereas the crankshaft is connected to the other pulley.

According to another embodiment of the invention, the transmission set is a triple input/output power transmission set having its third input/output connected to the electric machine. Such a transmission set comprises advantageously an epicyclic gear train. According to several embodiments of the invention, the part of the gear train which is coupled to the crankshaft of the engine is its sun, its ring or its satellite-carrier. Similarly, the part of the gear train which is coupled to the turbine can be its sun, its ring or its satellite carrier. The electric machine can work as a generator or as a motor, depending on the working conditions of the power unit.

The unit can include another electric machine electrically connected to the electrical power storage means and coupled to the crankshaft independently of the triple input/output transmission set. The unit can include another electric machine electrically connected to the electrical power storage means and mechanically coupled to the second turbine and to the first input/output of the power transmission set.

The unit can include another electric machine electrically connected to the electrical power storage means and mechanically coupled to a turbine and a compressor of the turbocharger.

The electric machines are connected to the electrical power storage means via a power control unit which is also connected to electrical loads on the vehicle.

Both electric machines can work as a generator or as a motor, depending on the working conditions of the power unit.

The other electric machine can deliver, when it works as a motor, a maximum power which is higher than the maximum power which can be delivered by the electric machine connected to the second input/output of the transmission set. In other words, the other electric machine has a higher power capacity than the electric machine connected to the transmission set.

The second turbine is located in the same exhaust line and downstream of the first turbine.

The invention also concerns an automotive vehicle, in particular a truck, which includes a power unit as mentioned here above. Such a vehicle is more efficient to run than known HEVs.

BRIEF DESCRIPTION OF THE DRAWINGS

The invention will now be explained in correspondence with the annexed figures and as an illustrative example, without restricting the invention. In the annexed figures:

FIG. 1 is a schematic representation of a power unit of the prior art,

FIG. 2 is a view similar to FIG. 1, at a larger scale, for a power unit according to a first embodiment of the invention.

DETAILED DESCRIPTION

Figure 3:
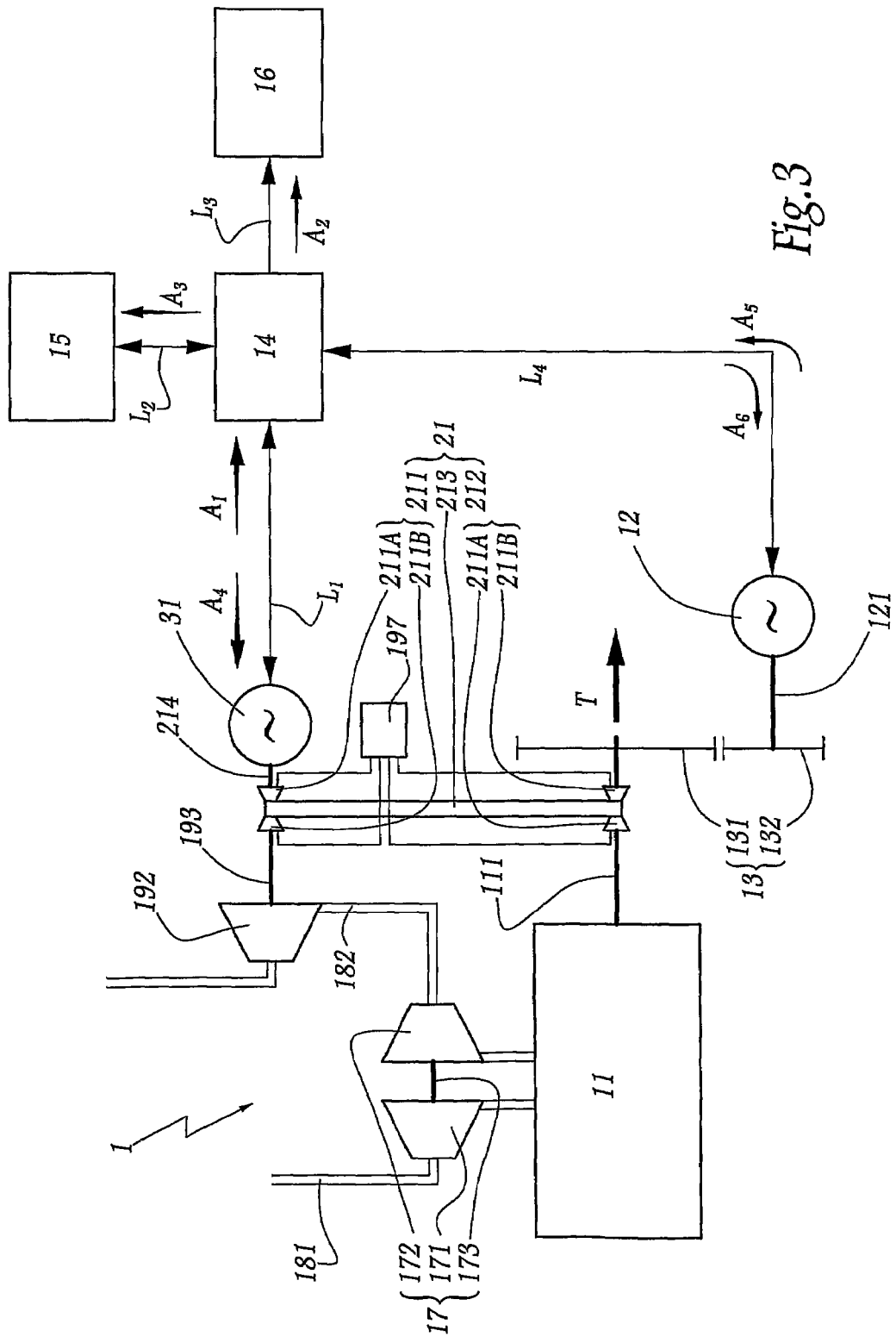
FIG. 3 is a view similar to FIG. 2 for a power unit according to a second embodiment of the invention.

The power unit 1 represented on FIG. 2 belongs to a truck and comprises a Diesel internal combustion engine 11 whose crankshaft 111 is supposed to transmit, to a non represented transmission assembly of an automotive vehicle, a torque T.

Engine 11 is also provided with a turbocharger 17 which comprises a compressor 171 and a turbine 172 coupled to the compressor in order to drive it. Compressor 171 and turbine 172 have a common shaft 173, so that they rotate together. Compressor 171 is installed in an inlet or feeding line 181 of engine 11 whereas turbine 172 is installed in an exhaust line 182 of engine 11.

A second turbine 192 is installed within line 182, downstream of turbine 172, so that it is driven by the exhaust gases exiting engine 11, similarly to turbine 172. If engine 11 has several exhaust lines, turbine 192 182 can be installed in an exhaust line different from the one of turbine 172.

Turbine 192 is coupled by its output shaft 193 to a continuously variable transmission set or CVT set 21 having an adjustable speed reduction ratio, possibly through a speed reduction gear. CVT set 21 comprises a first bi-conical pulley 211 made of two parts 211 A and 211 B having each a frustro-conical shape. A first part 211 A of pulley 211 is fast in rotation with, shaft 193. The second part 211 B of pulley 211 is connected to, that is fast in rotation with, a shaft 193' aligned with shaft 193. Shafts 193 and 193' are fast in rotation so that items 192, 193, 193', 211 A and 211 B rotate together. Shafts 193 and 193' can be built as one single part. Control means 197 are provided to adjust the distance d between parts 211 A and 211 B in a direction parallel to shafts 193 and 193'. CVT 21 also includes a second bi-conical pulley 212 fast in rotation with shaft 111, possibly through a reduction gear, and made of two parts 212A and 212B whose distance d' can also be adjusted by control means 197. A belt 213 runs between pulleys 211 and 212. Thanks to control means 197, the speed reduction ratio between the rotation speed of pulleys 211 and 212 can be adjusted by varying distances d and d'.

Parts 211A, 211 B, 212A and 212B are moved with respect to each other in such a way that belt 213 has a substantially constant tension.

Thanks to control means 197, CVT speed ratio between its two pulleys 211 and 212 can be adjusted in such a way that the rotation speeds of shaft 193 and crankshaft 111 correspond to optimized working conditions of turbine 192 and engine 11.

An electric machine 31 is also coupled to pulley 211, namely to part 211 B, via shaft 193'. CVT also allows to adjust the rotation speed of machine 31 with respect to the rotation speed of crankshaft 111. Shaft 193' forms the central shaft of machine 31 which rotates at the same speed as turbine 192. If, according to a non represented alternative embodiment, a reductor is installed between items 192 and 31, machine 31 runs at a speed which is proportional to and depends on the rotational speed of turbine 192.

Electric machine 31 is connected by a first electric line L1 to a power control unit 14 which is piloted by a central non represented main control unit of the truck. Unit 14 is connected by an electric line L2 to electrical power storage means which, in this example, are formed of a battery set 15. Unit 14 is also connected by a third electrical line L3 to several electrical loads 16 such as a lighting system of the vehicle, an electrical or electronical control system, some motors for various appliances.

Power in lines L1 and L2 can go in both directions that is, respectively, from machine 31 to unit 14 and reverse, and from unit 14 to set 15 and reverse. Power in line L3 can go only from unit 14 to loads 16.

When engine 11 runs above a given speed, exhaust gazes in line 182 are fast enough to drive turbine 192 which then drives pulley 211. When pulley 211 is driven by shaft 193, CVT set 21 forwards some power to shaft 111 via belt 213 and pulley 212.

Machine 31 can work as a motor or as a generator. When it is driven by shaft 193' fast with pulley 211, machine 31 works as a generator and can provide power unit 14 with electrical power, as shown by arrow A-i. Unit 14 can distribute the power coming from machine 31 between electrical loads 16 and battery set 15, as shown by arrows A2 and A3. Therefore, thanks to CVT set 21, power recovered by turbine 192 is transmitted partly to crankshaft 111, as mechanical power, and partly to power unit 14, as electrical power.

One should note that power recovery can take place via machine 31 even when the truck does not brake, in particular when it runs with a stabilized speed since turbine 192 is driven by exhaust gases under these conditions.

Electric machine 31 can also work as a motor when it is provided with electrical power, as shown by arrow A4. Under such circumstances, some extra power is delivered by machine 31 to pulley 211, this power being transferred to crankshaft 111 via belt 213 and pulley 212.

CVT 21 enables power transmission, with a variable ratio between turbine 192 and machine 31 on the one hand, and shaft 111, on the other hand. Each of these elements is connected to one input/output of CVT 21. A first input/output is formed by pulley 211. Items 192 and 31 are connected to this input/output. Crankshaft 111 is connected to pulley 212 which forms the second input/output of CVT 21. Mechanical power coming from turbine 192 or shaft 111 can be recovered, as electrical power, by machine 31. Besides, electrical power can be transformed, by machine 31 working as a motor, into mechanical power which can be transferred mainly to crankshaft 111. Moreover, in some working conditions of unit 1 and depending on the setting of CVT set 21, a part of the mechanical power transferred by electrical machine 31 working as a motor to shaft 193' can also be directed to turbine 192 which can be used to accelerate exhaust gases within exhaust line 182 in order to enhance air feeding to engine 11 through turbocharger 17, since the depression created in line 182 drives turbine 172 and compressor 171.

Therefore, thanks to the invention, a great versatility of the power transmission within power unit 1 can be obtained.

In the embodiment of FIG. 3, the same elements as in FIG. 2 bear the same references. Crankshaft 111 is provided with a first pinion 131 which meshes with a second pinion 132 mounted on the shaft 121 of another electric machine 12 which can work as a motor or as a generator. Pinions 131 and 132 constitute together an example of a gear train 13 between shafts 111 and 121 where machine 12 and shaft 111 are mechanically coupled by a transmission with fixed speed ratio.

Instead of gear train 13, other types of gear trains could be used, such as an epicyclic gear. Power transmission between shafts 111 and 121 can also take place via belts and pulleys or pinions, as long as the ratio of the speeds of these shafts is constant.

According to an alternative embodiment of the invention, shafts 111 and 121 might be formed by the same part. Machine 12 is then said to be integrated into engine 11.

Machine 12 is electrically connected to power unit 14 via an electric line L4. In this embodiment, unit 1 works as follows: when the vehicle is braking, electric machine 12 works as a generator and provides unit 14 with electric power, as shown by arrow A5. Unit 14 can distribute the power between electrical loads 16 and battery set 15, as shown by arrows A2 and A3. When the vehicle is being accelerated, electric machine 12 can be used as a motor to assist engine 11, thanks to the energy provided by the battery set 15 through control unit 14, as shown by arrow A6.

On the other hand, as soon as turbine 192 rotates, some extra power can be transferred to machine 31 and/or shaft 111, as explained for the embodiment of FIG. 2.

Power may also go directly from one machine 12 or 31 to the other, via unit 14, without being stored in battery set 15.

The torque delivered by machine 12, when it works as a motor, depends on the rotation speeds of engine 11. This torque is quite constant at low rotation speed of the engine and then decreases.

Therefore, by a proper control of unit 14, power can be added to crankshaft 111 by either one or both machines 12 and 31. On the other hand, a part of the mechanical power transferred to crankshaft 111 by engine 11 can be transformed into electrical power by either one or both machines 12 and 31.

Unit 14 allows to direct a part only or the totality of the power coming from electric machine 31 towards electric machine 12, which corresponds to a great flexibility of the invention.

In some other working conditions of unit 1, machine 31 can be used as a motor, on the basis of power provided by battery set 15 through control unit 14 as shown by arrow A6. The mechanical power transferred to CVT set 21 can be used to drive shaft 111 or turbine 192 as in the embodiment of FIG. 2.

Figure 4:
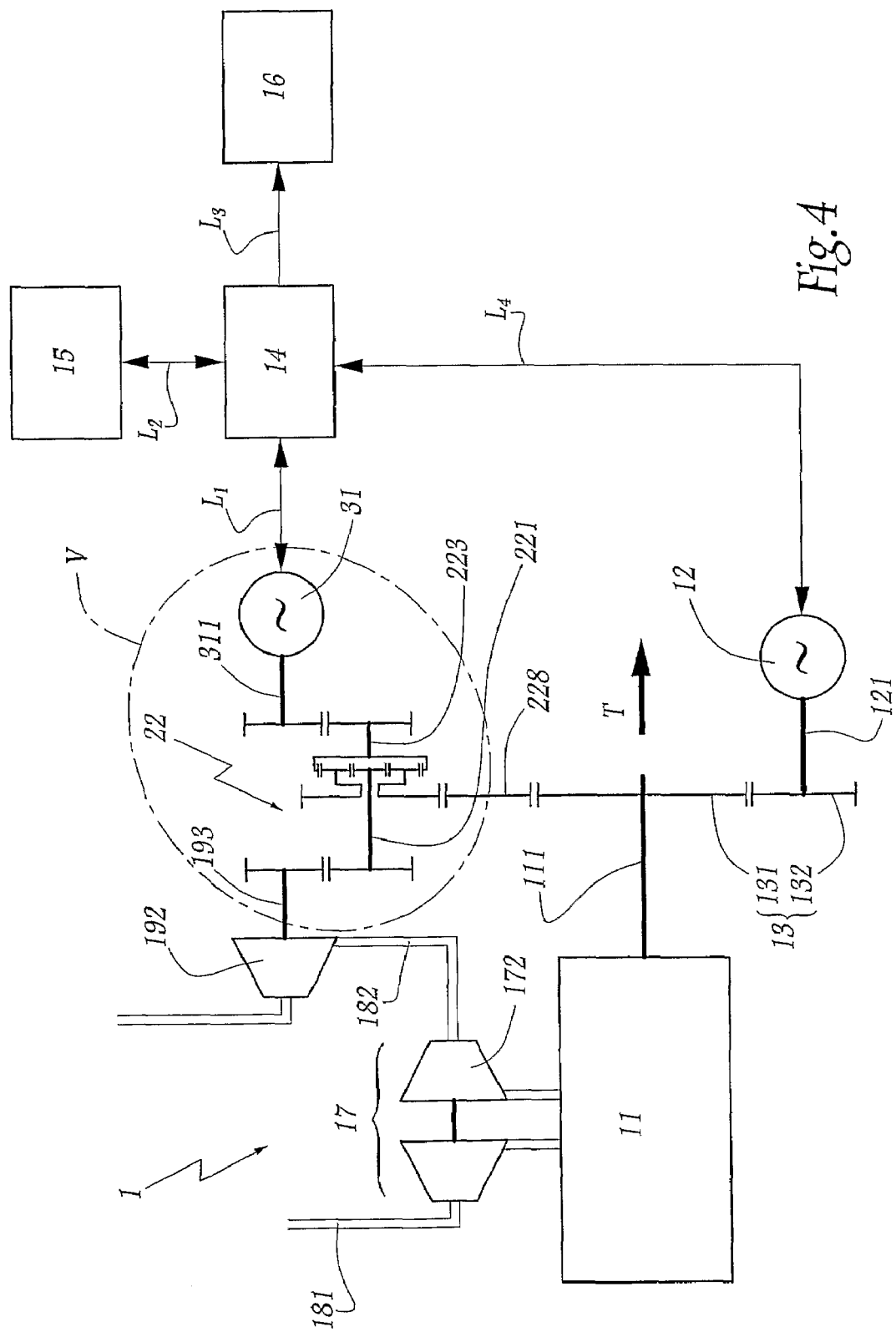
FIG. 4 is a view similar to FIG. 2 for a power unit according to a third embodiment of the invention.
Figure 5:
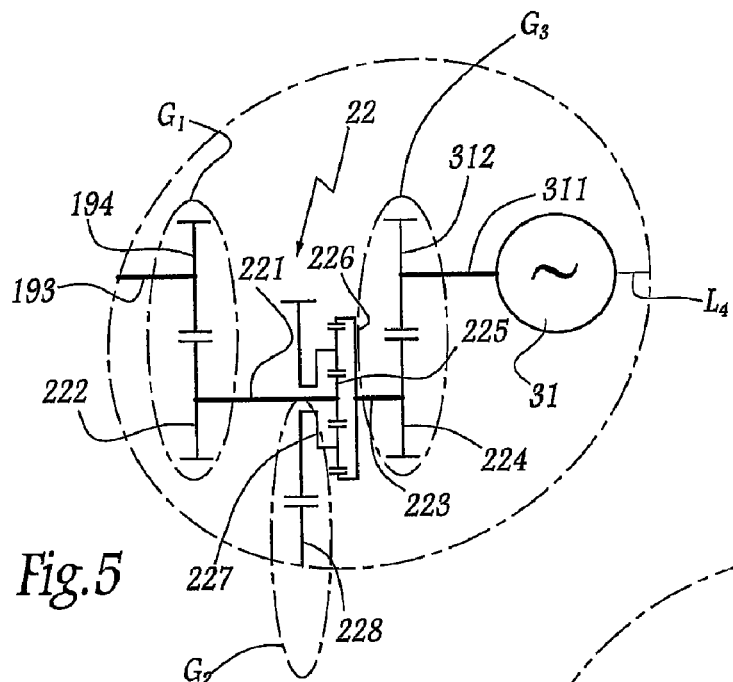
FIG. 5 is an enlarged view of detail V on FIG. 4.

In the third embodiment of the invention represented on FIGS. 4 and 5, the same elements as in the second embodiment bear the same references. The power unit 1 of this embodiment comprises an internal combustion engine 11, a first electric machine 12, a second electric machine 31, a turbocharger 17 which comprises, amongst others, a first turbine 172 located in an exhaust line 182 of engine 11. A second turbine 192 is also located in exhaust line 182 and can drive electric machine 31. A power control unit 14 is electrically connected to a battery set 15, electric loads 16 and machines 12 and 31, through lines L1, L2, L3 and L4 as mentioned for the second embodiment.

An epicyclic gear train 22 is installed between the output shaft 193 of turbine 192 and the central shaft 311 of electric machine 31. Gear train 22 forms a triple input/output power transmission set between items 192, 31 and 111.

As shown in detail on FIG. 5, shaft 193 is provided with a pinion 194 whereas shaft 311 is provided with another pinion 312. One shaft 221 of gear 22 is provided with a pinion 222 which meshes with pinion 194, whereas another shaft 223 of gear 22 is provided with another pinion 224 which meshes with pinion 312. Shaft 221 is fast with the sun 225 of gear 22, whereas shaft 223 is fast with the outer ring 226 of gear 22. The satellite-carrier 227 of gear 22 meshes with a pinion 228 which meshes with pinion 131 fast with crankshaft 111 of engine 11.

As shown on FIG. 5, three fixed speed ratio transmission gears G1, G2 and G3 can be identified. These gears are input/outputs for gear train 22. Gear d transmits torque between shafts 193 and 221, via pinions 194 and 222. Gear G2 transmits torque between carrier 227 and shaft 111, via pinion 228. Gear G3 transmits torque between shafts 223 and 311, via pinions 224 and 212.

Instead of pinions, one can use, for transmission gears G-i, G2 and G3, some other type of transmission sets, for example with pulleys and belts. Power transiting through gear 22 when turbine 192 drives machine 21 can be partly derivated by gear 22 to directly drive shaft 111, which increases the total torque T available on shaft 111.

Depending on the relative speed of shafts 193 and 111 and on the construction of gear train 22, machine 31 can work as a generator or as a motor when it is driven by turbine 192.

The rotation speed and direction of machine 31 depend on the rotation speeds of shafts 111 and 193. Gear train 22 can be designed so that the rotation speed of shaft 311 remains within a predetermined range, including zero, under normal working conditions of motor 11. In "hybrid" regenerative mode, that is when energy is recovered by machine 12 during breaking of crankshaft 111, a passive torque is applied by machine 12 which works as a generator and delivers electrical power to battery set 15 through unit 14. No torque is applied by machine 31 to turbine 192 and crankshaft 111.

In "compound" mode, when exhaust gazes drive turbine 192, machine 31 applies a torque on shaft 223 of gear 22, so that a passive torque is applied to shaft 193. Depending on its rotation direction, machine 31 produces or uses electrical power going to or coming from unit 14. In "compound" mode, the rotation speed of machine 31 is fixed by the respective speeds of crankshaft 111 and turbine 192, depending on the design of gear train 22 and transmission gears Gi, G2 and G3.

When machine 31 applies a passive or braking torque on gear train 22, it is transferred to shaft 193, so that the torque is applied to crankshaft 111. Depending on its direction of rotation, machine 31 is a generator or a motor and mechanical power is transmitted to or derived from crankshaft 111 via gear train 22. Maximum torque transmission from machine 31 to crankshaft 111 takes place when engine speed is above a reference speed.

The powers respectively delivered by engine 11, machine 12 and machine 31 can add up to constitute the total power obtainable on shaft 111. Power transmitted from turbine 192 to shaft 111 follows both an electrical way, via machines 31 and 12, and a mechanical way, via gear train 22 and transmission gear G3.

Machine 31 can also be used as a motor. In such a circumstance, shaft 193 may be braked or blocked, which induces that at least a part of the power generated by machine 31 goes to crankshaft 111 through transmission gears G2 and G3 and gear train 22. Here again, power control unit 14 can allow to easily control electric machines 12 and 31 in order to obtain the desired total power on crankshaft 111.

As a summary, by a proper control of machine 31 via unit 14, one can adjust the speed reduction ratio between shafts 193 and 111 so that both turbine 192 and engine 11 work at an optimal rotational speed. In other words, machine 31 can be used, as a motor or as a generator, to adjust, via gear train 22, the rotational speeds of shafts 193 and 111.

Figure 6:
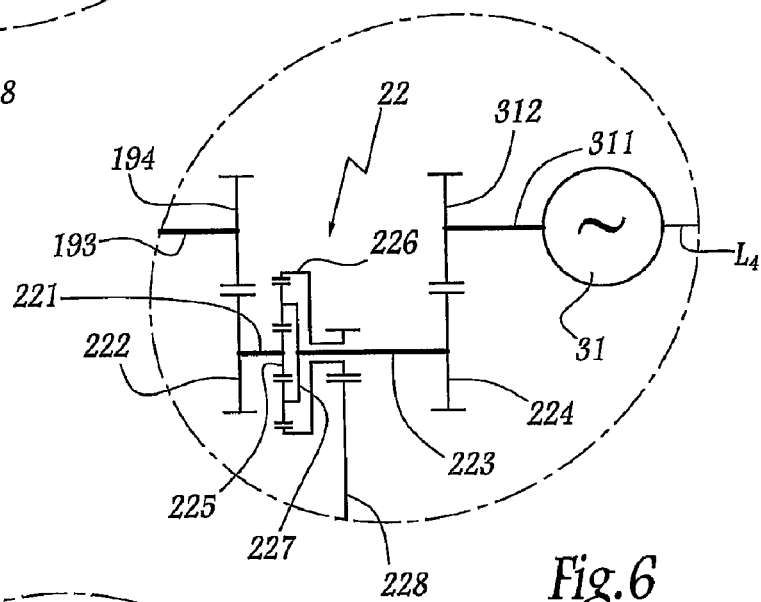
FIG. 6 is a view similar to FIG. 5 for a power unit according to a fourth embodiment of the invention.
Figure 7:
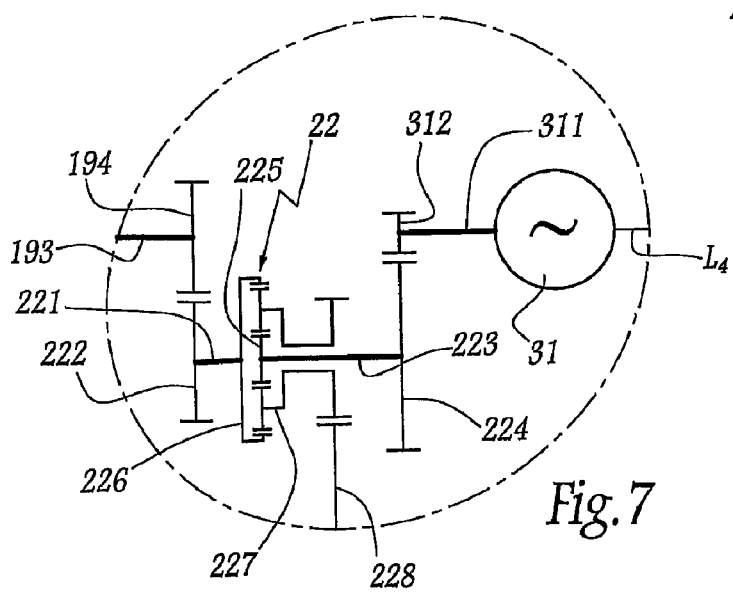
FIG. 7 is a view similar to FIG. 5 for a power unit according to a fifth embodiment of the invention.
Figure 8:
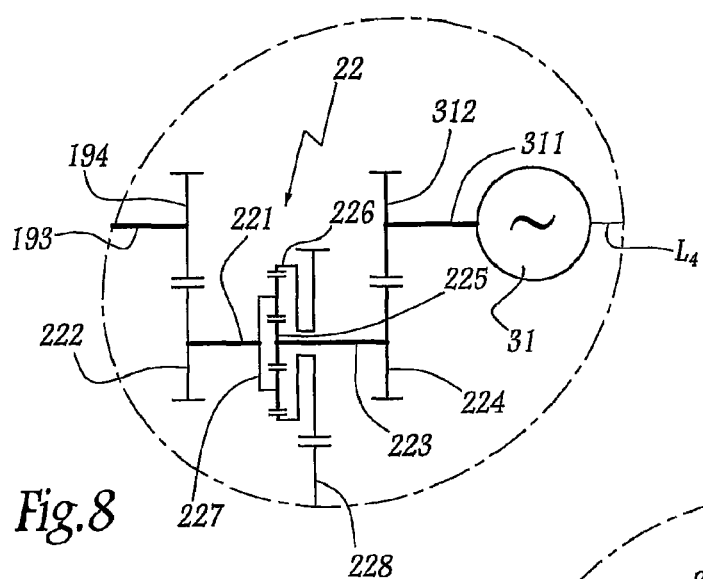
FIG. 8 is a view similar to FIG. 5 for a power unit according to a sixth embodiment of the invention.
Figure 9:
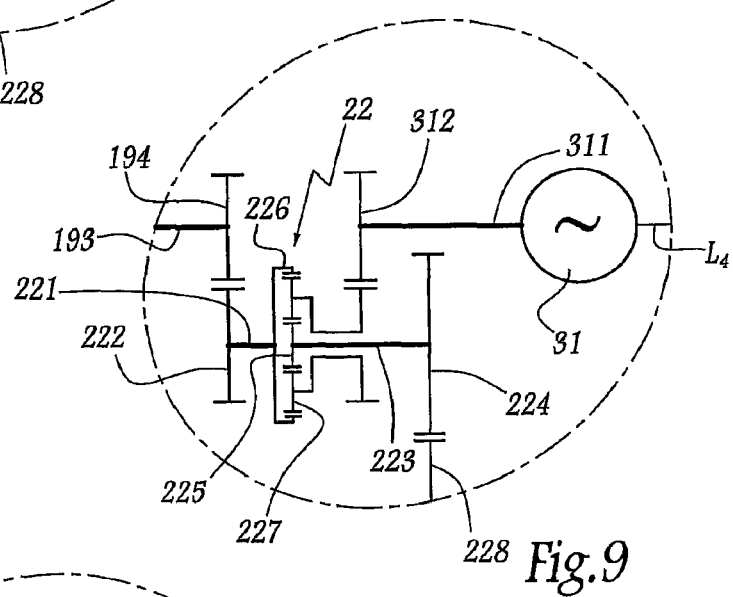
FIG. 9 is a view similar to FIG. 5 for a power unit according to a seventh embodiment of the invention.
Figure 10:
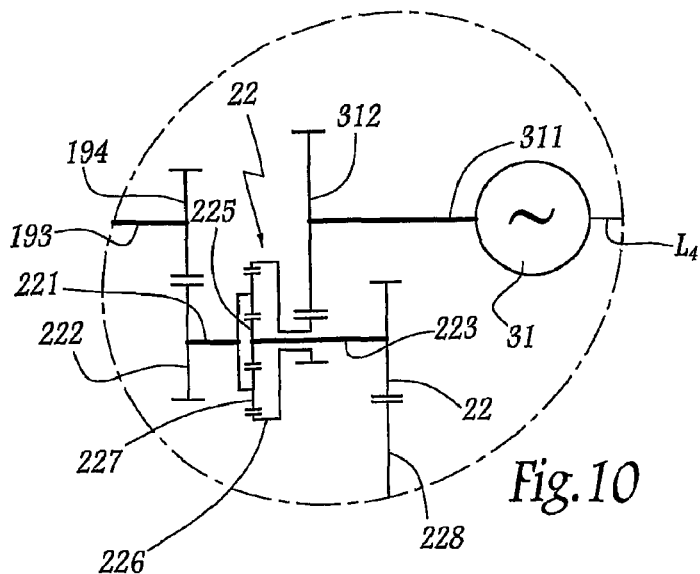
FIG. 10 is a view similar to FIG. 5 for a power unit according to an eighth embodiment of the invention.

As shown on FIGS. 6 and 8, the external ring 226 of an epicyclic gear 22 can be used to transmit power to crankshaft 111. As shown on FIGS. 7 and 8, the satellite-carrier 227 of an epicyclic gear 22 can be used for this purpose. As shown on FIGS. 8 and 10, the satellite carrier 227 of epicyclic gear train 22 can be coupled to shaft 193. As shown on FIGS. 7 and 9, one can couple the outside ring 226 of epicyclic gear 22 to shaft 193.

Figure 11:
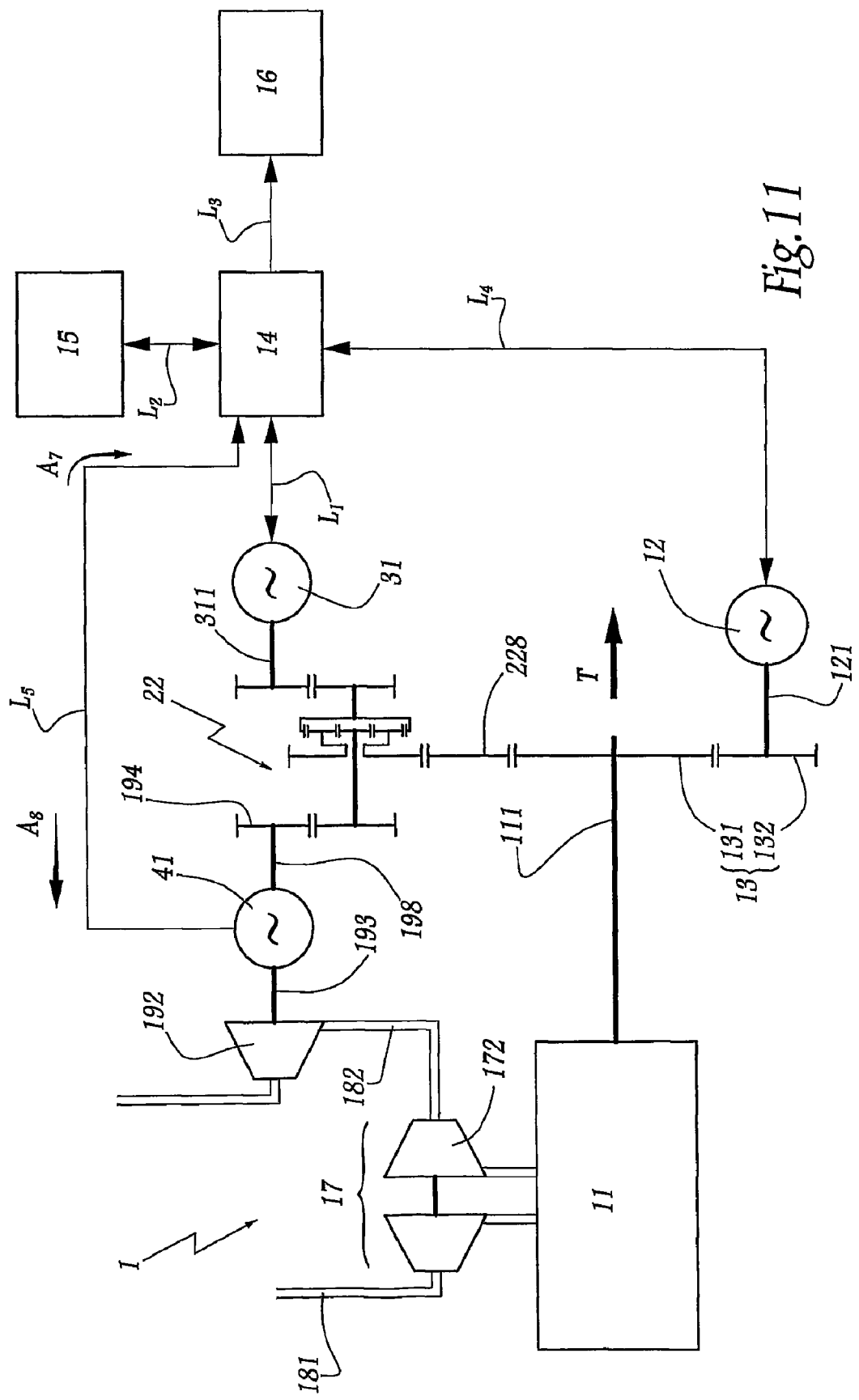
FIG. 11 is a view similar to FIG. 2 for a power unit according to a ninth embodiment.
Figure 12:
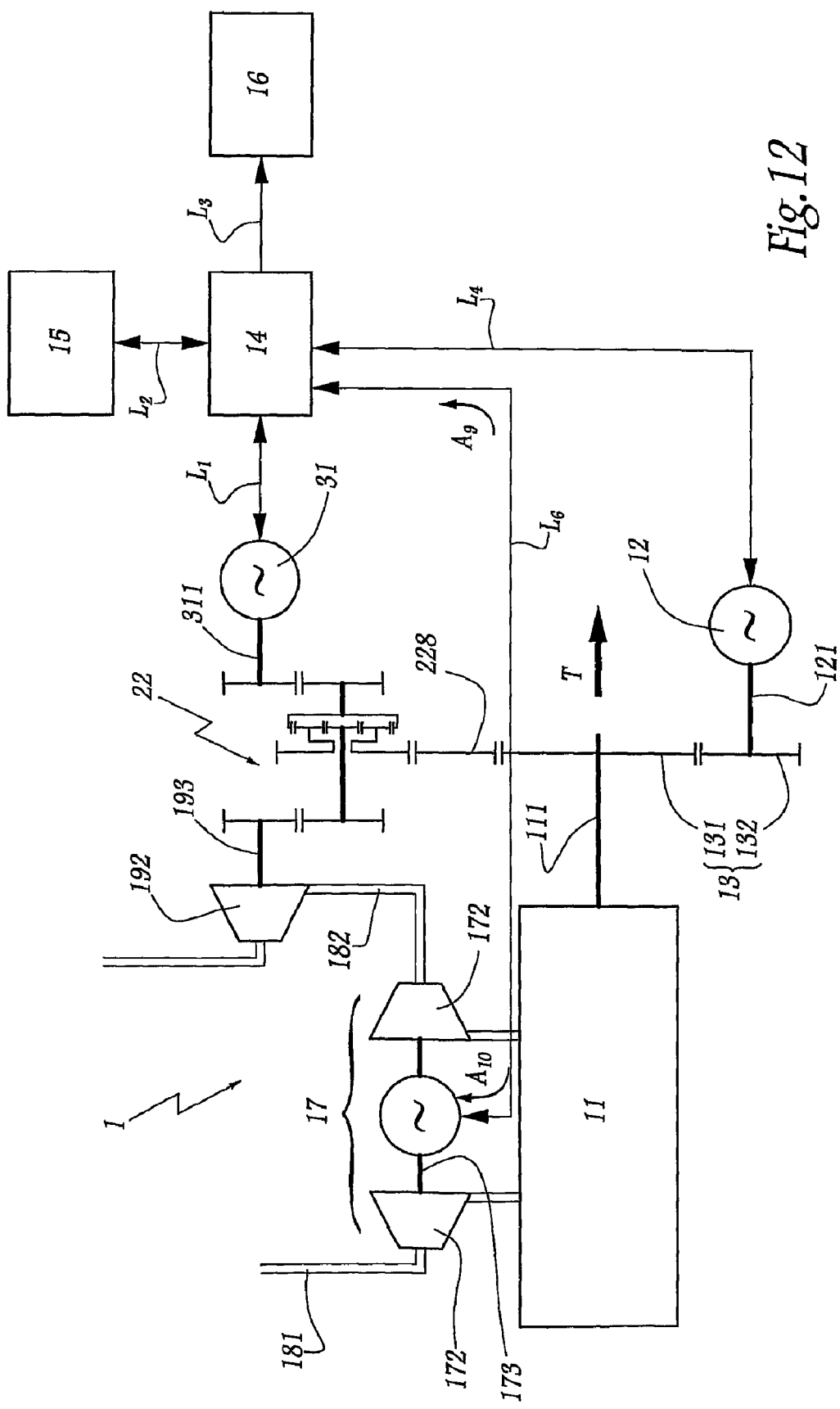
FIG. 12 is a view similar to FIG. 2 for a power unit according to a tenth embodiment.

In the ninth embodiment of the invention represented on FIG. 11, the same elements as in the third embodiment bear the same references. An additional electric machine 41 is installed between turbine 192 and gear train 22. Machine 41 is coupled to shaft 193 and to a shaft 198 fast with a pinion 194 similar to the pinion 194 of the third embodiment. Machine 41 can work as a motor or as a generator, depending on the working conditions of unit 1. Machine 41 is connected by an electrical line L5 to power unit 14. Electrical power can go from machine 41 working as a generator to unit 14, as shown by arrow A7, and from unit 14 to machine 41 working as a motor, as shown by arrow A8. Machine 41 allows to recover electrical power directly from turbine 192. When it works as a motor, machine 41 can drive directly turbine 192 and/or crankshaft 111 via gear train 22 In the tenth embodiment of the invention represented on FIG. 12, the same elements as in the third embodiment bear the same references. An electric machine 51 is installed on the shaft 173 of turbo charger 17, between its compressor 171 and its turbine 172. Machine 51 is mechanically coupled to items 171 and 172. Machine 51 is connected to power control unit 14 via an electric line L6 and power can go from machine 51 to unit 14, as shown by arrow A9, and from unit 14 to machine 51, as shown by arrow Ai0. Electric machine 51 can work as a generator in order to recover mechanical energy from turbine 172 and to transmit it to power control unit 14. This electrical power can then be distributed between battery set 15, electrical loads 16 and/or machines 12 and 31. Electrical machine 51 can also work as a motor to drive compressor 171 in order to enhance air feeding to engine 11.

In the embodiments of FIGS. 6 to 12, transmission gears similar to the ones G-I, G2 and G3 of FIG. 5 can be defined, with the same function. Turbine 192 is connected to gear G-i, crankshaft 111 is connected to gear G2 and machine 31 is connected to gear G3. In the embodiments of FIGS. 3 to 12, electric machine 12 is preferably the main source of power addition to engine 11. It is more powerful than machine 31. For example, machine 12 can have a nominal power between 100 and 150 kW, whereas machine 31 has a nominal power between 5 and 50 kW. In the embodiments of FIGS. 3 to 12, machine 12 can be an alternator/state starter machine, which is a relatively low power hybrid machine.

However, machine 12 is optional in the embodiments of FIGS. 4 to 12. In other words, only one electric machine could be used with an epicyclic gear train, according to an approach similar to the one of the embodiment of FIG. 2.

Instead of epicyclic gear train 22, one can use another type of triple input/output transmission set, e.g. a classical automotive differential gear.

The technical features of the embodiments described hereabove can be combined. In particular, electrical machines similar to machines 41 and 51 can be added to the embodiments where they are not represented, including the ones of FIGS. 2 and 3.

In all the embodiments of the invention, depending on the working conditions of engine 11, machine 31 can be used as a generator in order to load battery set 15 when the speed of the engine increases or is above a limit value. The torque generated by this electric machine working as a motor in some conditions can be used by this machine in order to improve the working conditions of the engine, either by acting on exhaust line 182, as in the first embodiment, or by acting directly on the crankshaft 111 of the engine, as in the second to seventh embodiments.

LIST OF REFERENCES

1 power unit
11 internal combustion engine
111 crankshaft
112 pinion
12 electric machine
121 shaft
13 gear train
131 pinion
132 pinion
14 control unit
15 battery set
16 electrical loads
17 turbocharger
171 compressor
172 turbine
173 shaft
181 inlet line
182 exhaust line
192 turbine
193 output shaft
193' shaft
194 pinion
197 control means
198 shaft
20 hydraulic torque converter
21 continuously variable transmission set (CVT set)
211 pulley
211A first part
211 B second part
212 pulley
212A first part
212B second part
213 belt
22 epicyclic gear train
221 shaft
222 pinion
223 shaft
224 pinion
225 sun
226 ring
227 satellite-carrier
228 pinion
31 electric machine
311 shaft
312 shaft
41 electric machine
51 electric machine
Ai arrow
A2 arrow
A3 arrow
A4 arrow A5 arrow
A6 arrow
A7 arrow
A8 arrow
A9 arrow
Ai0 arrow
d distance between 211 A and 211 B
d' distance between 211A and 211 B
L1 electric line
L2 electric line
L3 electric line
L4 electric line
L5 electric line
L6 electric line
G1 transmission gear
G2 transmission gear
G3 transmission gear T torque

The invention claimed is:

1. A power unit for an automotive vehicle the unit comprising:
   an internal combustion engine,
   an electric machine electrically connected to an electrical power storage arrangement,
   a turbocharger comprising a first turbine located in an exhaust line of the engine,
   a second turbine located in an exhaust line of the engine, and drivingly connected to the electric machine, and
   a transmission set having a first input/output connected to the second turbine and a second input/output connected to a crankshaft of the internal combustion engine
   wherein the power transmission set is a triple input/output transmission set having a third input/output connected to the electric machine and has a speed reduction ratio between first and second inputs/outputs thereof that is adjustable by controlling the electric machine.

2. Power unit according to claim 1, wherein the triple input/output transmission set comprises an epicyclic gear train.

3. Power unit according to claim 2, wherein a sun of the sear train is coupled to the crankshaft.

4. Power unit according to claim 2, wherein a ring of the gear train is coupled to the crankshaft.

5. Power unit according to claim 2, wherein a satellite-carrier oldie gear train is coupled to the crankshaft.

6. Power unit according to claim 2, wherein a sun of the gear train is coupled to the turbine.

7. Power unit according to claim 2, wherein a ring of the gear train is coupled to the turbine.

8. Power unit according to claim 2, wherein a satellite carrier of the gear train is coupled to the turbine.

9. Power unit according to claim 1, wherein the electric machine can work as a generator or as a motor, depending on the working conditions of the power unit.

10. Power unit according to claim 1, wherein it also includes another electric machine electrically connected to the electrical power storage arrangement and coupled to the crankshaft independently of the triple input/output transmission set.

11. Power unit according to claim 10, wherein both electric machines can work as a generator or as a motor, depending on the working conditions of the power unit.

12. Power unit according to claim 1, wherein it also includes another electric machine electrically connected to the electrical power storage arrangement and mechanically coupled to the second turbine and to the first input/output of the transmission set.

13. Power unit according to claim 1, wherein it also includes another electric machine, electrically connected to the electrical power storage arrangement and mechanically coupled to a compressor (171) and to a turbine of the turbo charger.

14. An automotive vehicle including a power unit according to claim 1.

15. Power unit according to claim 1, comprising means for controlling the electric machine to adjust the speed reduction ratio between the first and second inputs/outputs to optimize working conditions of the second turbine and the internal combustion engine.

16. A power unit for an automotive vehicle the unit comprising:
   an internal combustion engine,
   an electric machine electrically connected to an electrical power storage arrangement,
   a turbocharger comprising a first turbine located in an exhaust line of the engine,
   a second turbine located in an exhaust line of the engine, and drivingly connected to the electric machine, and
   a transmission set having a first input/output connected to the second turbine and a second input/output connected to a crankshaft of the internal combustion engine, and
   another electric machine electrically connected to the electrical power storage arrangement and coupled to the crankshaft independently of the triple input/output transmission set,
   wherein the power transmission set is a triple input/output transmission set having a third input/output connected to the electric machine and has a speed reduction ratio between first and second inputs/outputs thereof that is adjustable and the other electric machine can deliver, when it works as a motor, a maximum power which is higher than the maximum power which can be delivered by the electric machine connected to the second input/output of the transmission set.

* * * * *